US012732353B2

(12) United States Patent
Tidwell

(10) Patent No.: US 12,732,353 B2
(45) Date of Patent: Sep. 8, 2026

(54) METHOD FOR GENERATING ENCRYPTION USING GRAPH THEORY AND GEOMETRIC CURVES

(71) Applicant: Leith Tidwell, Provo, UT (US)

(72) Inventor: Leith Tidwell, Provo, UT (US)

(73) Assignee: Leith Tidwell, Provo, UT (US)

( * ) Notice: Subject to any disclaimer, the term of this patent is extended or adjusted under 35 U.S.C. 154(b) by 14 days.

(21) Appl. No.: 18/680,992

(22) Filed: May 31, 2024

(65) Prior Publication Data

US 2025/0373418 A1 Dec. 4, 2025

(51) Int. Cl.
*H04L 9/08* (2006.01)

(52) U.S. Cl.
CPC .................................. *H04L 9/0861* (2013.01)

(58) Field of Classification Search
CPC .................................................... H04L 9/0861
See application file for complete search history.

(56) References Cited

U.S. PATENT DOCUMENTS 7,079,650 B1 * 7/2006 Knudsen ................. G06F 7/725 708/492
9,800,411 B1 * 10/2017 Brown .................. H04W 12/06
10,372,528 B1 * 8/2019 Anderson ............... G06F 21/00
2006/0062384 A1 * 3/2006 Dondeti ................ H04L 9/0816 380/283
2014/0181523 A1 * 6/2014 Morrison ................ G06F 21/32 713/168
2021/0306144 A1 * 9/2021 Chen ..................... H04L 9/3066
2024/0223368 A1 * 7/2024 Harvey ................. H04L 9/3066

FOREIGN PATENT DOCUMENTS

EP 4369234 A1 * 5/2024 ........... G06F 21/602
WO WO-2021219673 A1 * 11/2021 ........ H04W 12/0471

OTHER PUBLICATIONS

Charles (Cryptographic hash functions from expander graphs, 2006) (Year: 2006).

* cited by examiner

*Primary Examiner* — Darshan I Dhruv
(74) *Attorney, Agent, or Firm* — PATENT LAW WORKS LLP

(57) ABSTRACT

The present invention is a method for generating encryption using graph analysis to create geometric curves. This method increases the strength of encryption keys while maintaining reduced time complexity.

4 Claims, No Drawings

METHOD FOR GENERATING ENCRYPTION USING GRAPH THEORY AND GEOMETRIC CURVES

FIELD OF THE INVENTION

The present method invention relates to the field of cryptography and encryption of data.

BACKGROUND OF THE INVENTION

Cryptography is developed from the idea the key you use to encrypt data can be shared publicly and executed privately. This cryptography requires a series of equations easy to execute but difficult to reverse. The difference between ease in executing a method in one direction and difficulty in reversal of the method is considered the overall strength of a cryptographic system. Most current cryptographic systems utilize either multiplication of random numbers with the strength of encryption depending on the difficulty of factoring or breakdown of the multiplication or the generation of an encryption key using graphical curve equations for random variables. Modern electronic systems have reduced ability to process large numbers which limits the potential length of encryption keys available to cryptographic systems. Conventional cryptographic approaches, such as RSA-based systems, rely on the computational difficulty of factoring large integers, but face growing vulnerabilities as computing power increases. Elliptic curve cryptography (ECC) offers improved security with smaller key sizes compared to RSA—for example, a 256-bit elliptic curve public key provides security comparable to a 3072-bit RSA key—but existing ECC implementations may still present trade-offs between encryption strength and computational time complexity. Edwards curve variants of elliptic curve cryptography provide exception-free addition formulas and faster group operations than standard Weierstrass curves, yet prior methods do not leverage graph-theoretic traversal of parabolic structures as a source of high-entropy key material. There is therefore a need for an encryption method that simultaneously increases encryption strength and reduces the time complexity of key generation.

DESCRIPTION OF THE INVENTION

The present invention method increases the strength of encryption while reducing time complexity needed for computation.

To solve these problems, applicants have invented a computer-implemented method for generating cryptographic keys using parabolic graph traversal combined with Edwards curve equations over a finite field. The method first generates a plurality of parabolic graphs using random number sets obtained from a hyperbolic random number generator, wherein every fourth value is a negative number, and applies vertex, factored, negative standard, and vertex parabolic equations in sequence to produce each graph. Best-connected nodes on each parabolic graph are then identified through depth-first search, topological sorting, and extraction of strongly connected components to the fiftieth node, followed by a breadth-first traversal to determine all-pairs shortest paths between connected graph points. The closest connected nodes between graphs are then used to construct plane curves over a finite field using Edwards curve equations, wherein coordinate groups derived from the breadth-first traversal serve as inputs for encryption key generation. This invention improves upon prior cryptographic methods because the parabolic graph traversal introduces a high-entropy, computationally efficient source of key material, while the Edwards curve's complete and unified addition law reduces susceptibility to side-channel attacks and lowers the overall computational time complexity of the key generation process.

This is accomplished using the following methods:

1) generate parabolas using a random number set:
  - a) obtain random number set for vertices by using hyperbolic random number generator with every fourth number a negative value.
  - b) use the vertex parabolic equation to generate graph with random numbers obtained from hyperbolic number generator for variables.
  - c) use factored parabolic equation to generate graph using next random number set.
  - d) use negative standard parabolic equation to generate graph using next random number set.
  - e) use vertex parabolic equation to generate graph using next random number set.
2) identify best-connected nodes on each parabolic graph:
  - a) depth-first search of parabolas.
  - b) topological sorting of parabolas using number points as nodes to the fiftieth node.
  - c) extract strongly-connected components of parabolas to the fiftieth node.
  - d) use breadth-first traversal to find the all-pairs shortest path between connected graph points.
3) use closest connected nodes between graphs to create a plane curve over a finite field using Edwards curve equations.
  - a) use curve equations to create plane curves over a finite field using coordinate groups from breadth-first traversal for encryption key generation.

Example Embodiments

The present invention can use equations, graphs, and curves to establish an encryption key. These include, but are not limited to, vertex and factored forms of the parabolic equations, depth-first search methods, breadth-first search, and enablement of finite curves.

Objects and Advantages

A new method of encryption is created which allows users to strengthen data protection through graph randomization while maintaining limited time complexity for computation. This method gives users stronger encryption without requiring either increased computational ability or time requirements.

The invention claimed is:

1. A computer-implemented method for generating encryption keys, the method comprising the steps of:

generating, by a computer, a plurality of parabolic graphs using random number sets, the generating comprising:

obtaining, by the computer, a first random number set for parabola vertices by executing a hyperbolic random number generator configured to produce output wherein every fourth number is a negative value;

generating, by the computer, a first parabolic graph by applying the first random number set to a vertex parabolic equation, wherein variables in the vertex parabolic equation are populated with random numbers obtained from the hyperbolic random number generator;

generating, by the computer, a second parabolic graph by applying a second random number set from the hyperbolic random number generator to a factored parabolic equation;

generating, by the computer, a third parabolic graph by applying a third random number set from the hyperbolic random number generator to a negative standard parabolic equation; and generating, by the computer, a fourth parabolic graph by applying a fourth random number set from the hyperbolic random number generator to a vertex parabolic equation;

identifying, by the computer, best-connected nodes on each parabolic graph of the plurality of parabolic graphs, the identifying comprising:

performing, by the computer, a depth-first search of each parabola in the plurality of parabolic graphs;

selecting, by the computer, closest connected nodes between parabolic graphs from the plurality of parabolic graphs based on all-pairs shortest paths;

creating, by the computer, a plane curve over a finite field using Edwards curve equations applied to the closest connected nodes, wherein coordinate groups obtained from a breadth-first traversal are input parameters to the Edwards curve equations; and generating, by the computer, an encryption key from the plane curve over the finite field;

encrypting data utilizing the encryption key; and transmitting the encrypted data to a separate computer.

2. The method of claim 1, wherein identifying best connected nodes on each parabolic graph further comprises performing, by the computer, topological sorting of parabolas using number points as nodes within each parabolic graph up to a predefined node count threshold.

3. The method of claim 1, wherein identifying best connected nodes on each parabolic graph further comprises extracting, by the computer, strongly-connected components of each parabola.

4. The method of claim 1, wherein identifying best connected nodes on each parabolic graph further comprises performing, by the computer, breadth-first traversal to determine all-pairs shortest paths between connected graph points on each parabola.

* * * * *